US011753110B2

(12) United States Patent
Martino

(10) Patent No.: US 11,753,110 B2
(45) Date of Patent: Sep. 12, 2023

(54) REVERSE TRIKE SUSPENSION AND DRIVETRAIN IMPROVEMENTS

(71) Applicant: Marc Gregory Martino, Westlake Village, CA (US)

(72) Inventor: Marc Gregory Martino, Westlake Village, CA (US)

( * ) Notice: Subject to any disclaimer, the term of this patent is extended or adjusted under 35 U.S.C. 154(b) by 0 days.

(21) Appl. No.: 17/661,607

(22) Filed: May 2, 2022

(65) Prior Publication Data
US 2022/0258834 A1 Aug. 18, 2022

Related U.S. Application Data

(63) Continuation-in-part of application No. 16/949,460, filed on Oct. 29, 2020, now Pat. No. 11,319,023.

(60) Provisional application No. 62/928,264, filed on Oct. 30, 2019.

(51) Int. Cl.
*B62M 17/00* (2006.01)
*B62M 9/02* (2006.01)
*B62M 7/02* (2006.01)
*B62K 5/027* (2013.01)

(52) U.S. Cl.
CPC ............. *B62M 17/00* (2013.01); *B62K 5/027* (2013.01); *B62M 7/02* (2013.01); *B62M 9/02* (2013.01)

(58) Field of Classification Search
CPC .......... B62M 17/00; B62M 7/02; B62M 9/02; B62K 5/027; B62K 11/04; B62K 25/04; B62K 5/05; B60G 2200/144; B60G 2200/46; B60G 2204/13; B60G 2204/421; B60G 2204/82; B60G 3/26; B60G 2300/122; B60G 3/20; B60G 7/006; B60G 11/006; B60G 15/067; B60G 21/026; B60T 1/16; B62D 37/02; B62J 17/00
See application file for complete search history.

(56) References Cited

U.S. PATENT DOCUMENTS

| 9,845,129 | B2 * | 12/2017 | Simon | B61F 5/00 |
| 10,875,597 | B2 * | 12/2020 | Mizuno | B62K 5/10 |
| 11,292,517 | B2 * | 4/2022 | Yu | B62D 9/02 |
| 11,305,832 | B2 * | 4/2022 | Terada | B62K 5/007 |
| 2008/0290618 | A1 * | 11/2008 | Yanaka | B60G 17/0195 280/6.15 |
| 2014/0312580 | A1 * | 10/2014 | Gale | B62D 9/02 280/5.509 |
| 2018/0257706 | A1 * | 9/2018 | Kanehara | B62K 21/18 |

* cited by examiner

Primary Examiner — Drew J Brown
(74) Attorney, Agent, or Firm — Orbit IP; Marc Martino

(57) ABSTRACT

A rear suspension for a three-wheeled reverse trike includes a front lever arm pivotably affixed to a frame pivotable about a front lever arm pivot axis. A slider is translatably attached to the front lever arm. A first pushrod is pivotably connected at a first end to the slider and pivotably connected at a second end to at least one of a front upper or lower control arms for the front wheels. A rear lever arm is pivotably affixed to the frame and pivotable about a rear lever arm pivot axis, the rear lever arm extending to a rear lever arm distal end. A rod pivotably connects the front and lever arms. A first pivotable end of the rear upper control arm is pivotably connected to the rear lever arm distal end, and a second pivotable end of the rear upper control arm is pivotably connected to a rear spindle.

11 Claims, 5 Drawing Sheets

REVERSE TRIKE SUSPENSION AND DRIVETRAIN IMPROVEMENTS

CROSS-REFERENCE TO RELATED APPLICATIONS

This continuation-in-part application claims priority to non-provisional application Ser. No. 16/949,460 filed on Oct. 29, 2020 and is now U.S. Pat. No. 11,319,023 issued on May 3, 2022, which itself claims priority to provisional application 62/928,264 filed on Oct. 30, 2019, the entire contents of which is fully incorporated herein with this reference.

DESCRIPTION

Field of the Invention

The present invention generally relates to motor vehicles for the transportation of people. More particularly, the present invention relates to improvements to reverse trike vehicles in regards to the suspension and drivetrain.

BACKGROUND OF THE INVENTION

The inventor of this present application previously obtained U.S. Pat. Nos. 7,588,110 and 8,061,465, the entire contents of which are fully incorporated herein with these references. This invention is directed to further improvements of the suspension and drivetrain for such similar vehicles as previously taught.

SUMMARY OF THE INVENTION

In one embodiment of the present invention a three-wheeled vehicle 10 comprises: a frame 12 configured for supporting a driver and a plurality of mechanical devices, wherein the frame is defined as having a front portion 14, a rear portion 16, a vertical cross plane 18, a right portion 20, a left portion 22, and a vertical center plane 24, wherein the front portion is opposite the rear portion and is generally divided by the vertical cross plane, and wherein the right portion is opposite the left portion and is generally divided by the vertical center plane; a pair of steerable front wheels 26 rotatably affixed to the frame positioned at opposite sides of the front portion generally equally separated by the vertical center plane, and wherein the pair of steerable front wheels rotate in both a pair of rolling axes 28 and a pair of turning axes 30, wherein the pair of rolling axes allow the pair of steerable front wheels to roll upon a surface 32 wherein the surface is substantially perpendicular to both the vertical center plane and the vertical cross plane, wherein the pair of rolling axes are substantially parallel with the surface, and wherein the pair of turning axes are substantially parallel to both the vertical center plane and the vertical cross plane, wherein the driver is configured to change direction of the pair of steerable front wheels relative to the orientation of the frame about the pair of turning axes through a driver steering input; a single rear wheel 34 rotatably affixed to the frame generally centered along the vertical center plane and positioned about the rear portion behind the vertical cross plane, wherein the rear wheel rotates in a rear rolling axis 36 wherein the rear rolling axis is substantially parallel to the vertical cross plane and substantially perpendicular to the vertical center plane, such that the rear wheel can roll upon the surface, wherein the rear wheel is connected to a rear wheel drive sprocket 130; a motor 38 affixed to the frame generally centered along the vertical center plane, the motor having a motor output sprocket 111; a driver seat 40 affixed to the frame disposed after the motor and ahead of the rear wheel; and a drivetrain system 110 configured to transmit power from the motor to the rear wheel, the drivetrain system comprising: a first drive chain C4; a second drive chain C5; a jackshaft 112 having at one end a first universal joint 118 connected to a first jackshaft sprocket 120 and at an opposite end having a second universal joint 122 connected to a second jackshaft sprocket 124; wherein the first drive chain is connected between the motor output sprocket 111 and the first jackshaft sprocket 120; wherein the second drive chain is connected between the second jackshaft sprocket 124 and the rear wheel drive sprocket 130; wherein the first jackshaft sprocket is rotatably attached to the frame and configured to be movable away from and towards the motor output sprocket; wherein the second jackshaft sprocket is rotatably attached to the frame and configured to be movable away from and towards the rear wheel drive sprocket; and wherein the first drive chain C4 and the second drive chain C5 are the only drive chains in the drivetrain system.

In other exemplary embodiments the jackshaft 112 may include a splined connection having a male spline portion 114 translatable within a female spline portion 116 along a jackshaft axis 113.

In other exemplary embodiments the rear wheel may be rotatably attached to frame by a lower control arm 134 and an upper control arm 132.

In other exemplary embodiments a rear wheel jackshaft 112 may connect the rear wheel to the rear wheel drive sprocket, wherein the rear wheel jackshaft has at one end a rear wheel first universal joint 118 connected to the rear wheel and at an opposite end has a rear wheel second universal joint 122 connected to the rear wheel drive sprocket.

In other exemplary embodiments the rear wheel jackshaft 112 may include a rear wheel splined connection having a rear wheel male spline portion 114 translatable within a rear wheel female spline portion 116 along a rear wheel jackshaft axis 113.

In other exemplary embodiments a spring and shock 106 may be mechanically connected between one of the lower or upper control arms and the frame.

In other exemplary embodiments a pushrod 136 may mechanically connect the lower control arm to the spring and shock.

In other exemplary embodiments a lever arm 162 may be pivotably connected to the frame about a pivot axis 164, wherein a distal end 165 of the lever arm is connected to one end of the upper control arm and another end of the upper control arm is pivotably connected to a rear wheel spindle 168.

In other exemplary embodiments a rod 160 may be mechanically connected to the lever arm about the pivot axis and mechanically connected at another end to a front suspension of the three-wheeled vehicle.

In another embodiment of the present invention a three-wheeled vehicle 10 comprises: a frame 12 configured for supporting a driver and a plurality of mechanical devices, wherein the frame is defined as having a front portion 14, a rear portion 16, a vertical cross plane 18, a right portion 20, a left portion 22, and a vertical center plane 24, wherein the front portion is opposite the rear portion and is generally divided by the vertical cross plane, and wherein the right portion is opposite the left portion and is generally divided by the vertical center plane; a pair of steerable front wheels 26 rotatably affixed to the frame positioned at opposite sides of the front portion generally equally separated by the vertical center plane, and wherein the pair of steerable front wheels rotate in both a pair of rolling axes 28 and a pair of turning axes 30, wherein the pair of rolling axes allow the pair of steerable front wheels to roll upon a surface 32 wherein the surface is substantially perpendicular to both the vertical center plane and the vertical cross plane, wherein the pair of rolling axes are substantially parallel with the surface, and wherein the pair of turning axes are substantially parallel to both the vertical center plane and the vertical cross plane, wherein the driver is configured to change direction of the pair of steerable front wheels relative to the orientation of the frame about the pair of turning axes through a driver steering input; a single rear wheel 34 rotatably attached to a rear wheel spindle 168 which is attached to the frame by a lower control arm 134 and an upper control arm 132, wherein the rear wheel is centered along the vertical center plane and positioned about the rear portion behind the vertical cross plane, wherein the rear wheel rotates in a rear rolling axis 36 wherein the rear rolling axis is substantially parallel to the vertical cross plane and substantially perpendicular to the vertical center plane, such that the rear wheel can roll upon the surface, wherein the rear wheel is connected to a rear wheel drive sprocket 130; a motor 38 affixed to the frame generally centered along the vertical center plane, the motor having a motor output sprocket 111; a drivetrain system 110 configured to transmit power from the motor to the rear wheel, the drivetrain system comprising: a first drive chain C4; a second drive chain C5; a jackshaft 112 having at one end a first universal joint 118 connected to a first jackshaft sprocket 120 and at an opposite end having a second universal joint 122 connected to a second jackshaft sprocket 124; wherein the first drive chain is connected between the motor output sprocket 111 and the first jackshaft sprocket 120; wherein the second drive chain is connected between the second jackshaft sprocket 124 and the rear wheel drive sprocket 130; wherein the first jackshaft sprocket is rotatably attached to the frame and configured to be movable away from and towards the motor output sprocket; wherein the second jackshaft sprocket is rotatably attached to the frame and configured to be movable away from and towards the rear wheel drive sprocket; wherein the first drive chain C4 and the second drive chain C5 are the only drive chains in the drivetrain system; and a rear wheel jackshaft 112 connecting the rear wheel to the rear wheel drive sprocket, wherein the rear wheel jackshaft has at one end a rear wheel first universal joint 118 connected to the rear wheel and at an opposite end has a rear wheel second universal joint 122 connected to the rear wheel drive sprocket.

In another embodiment of the present invention, the pair of steerable front wheels are rotatably connected to the frame each through a respective front upper control arm 144 and a front lower control arm 146. A front lever arm 150 is pivotably affixed to the frame disposed along the front portion and pivotable about a front lever arm pivot axis, where the front lever arm pivot axis is substantially parallel to the vertical center plane and/or surface. A slider 154 is translatably attached to the front lever arm. A first pushrod 156 is pivotably connected at a first end 156a to the slider and pivotably connected at a second end 156b to at least one of the front upper control arm or the front lower control arm of the pair of steerable front wheels. A rear lever arm 162 is pivotably affixed to the frame disposed along the rear portion and pivotable about a rear lever arm pivot axis, where the rear lever arm extends to a rear lever arm distal end 165, wherein the rear lever arm pivot axis is substantially parallel to the vertical center plane and/or surface. A drive shaft rod 160 is connected at a first end 160a to the front lever arm at the front lever arm pivot axis and connected at a second end 160b to the rear lever arm at the rear lever arm pivot axis, wherein the drive shaft rod pivotably connects the front lever arm to the rear lever arm to pivot together. A first pivotable end 132a of either the rear upper control arm or the rear lower control arm is pivotably connected to the rear lever arm distal end, and a second pivotable end 132b of the respective rear upper control arm or the rear lower control arm is pivotably connected to the rear spindle.

Furthermore, a second pushrod 158 may be pivotably connected at a first end 158a to the slider and pivotably connected, either directly or indirectly, at a second end 158b to at least one of the front upper control arm or the front lower control arm of the pair of steerable front wheels for which the first pushrod is not connected to.

Furthermore, an embodiment may include a second pushrod 158, a third pushrod 159 and a fourth pushrod 157, wherein the second pushrod is pivotably connected at a first end 158a to the slider, wherein the third pushrod at a first end 159a is connected to at least one of the front upper control arm or the front lower control arm of the pair of steerable front wheels for which the first pushrod is not connected to, wherein the fourth pushrod at a first end 157a is pivotably connected to the frame, and wherein a second end 158b, 159b, 157b of the second, the third and the fourth pushrods are pivotably connected together.

DETAILED DESCRIPTION OF THE PREFERRED EMBODIMENTS

Figure 1:
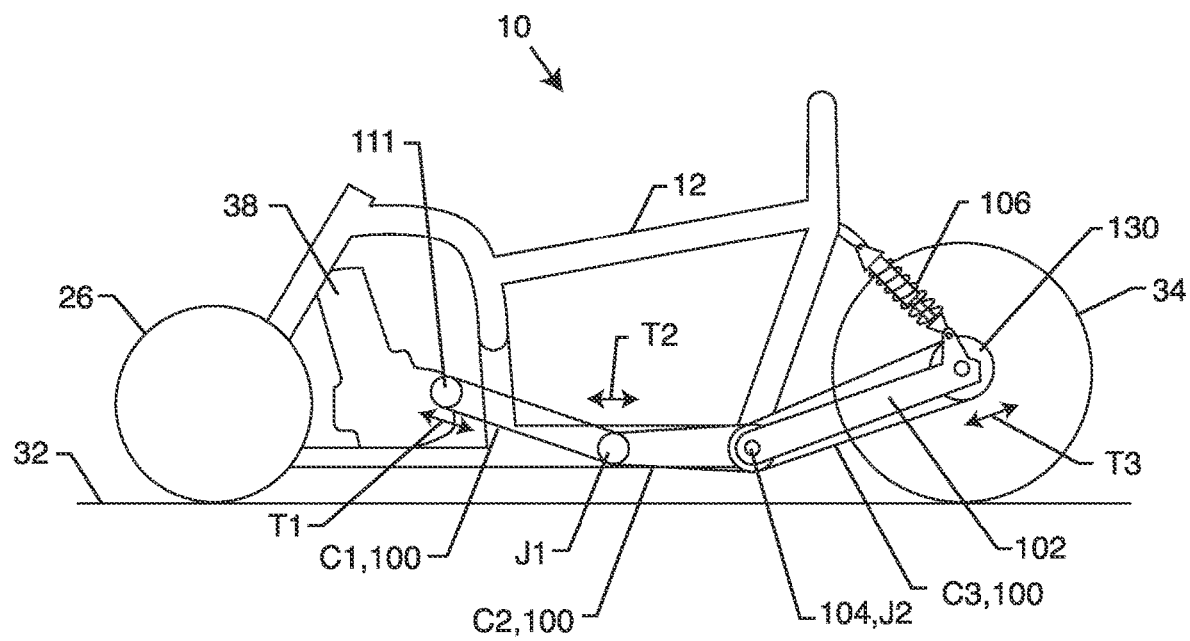
FIG. 1 is a simplified side view of the reverse trike previously taught by the inventor.

Again, the inventor of this present application previously obtained U.S. Pat. Nos. 7,588,110 and 8,061,465, the entire contents of which are fully incorporated herein with these references. Therefore, the inventor will use reference numerals consistent with said referenced applications and continue on with this new teaching with new reference numerals where appropriate.

It is understood by those skilled in the art that when the inventors teach that the pair of rolling axes are "substantially parallel with the surface" and the pair of turning axes are "substantially parallel to both the vertical center plane and the vertical cross plane" that this includes and does not preclude the small allowance and deviations generally accepted for suspension setup being that of changes in toe, caster, camber and the like as this teaching is understood not to be absolute in terms of its claim interpretation.

FIG. 1 is a highly simplified side view of a prior art reverse trike 10 similar to that taught in the '110 and '465 patents. There are two front tires 26 and one rear tire 34 that is centered along the centerline of the vehicle. There is a motor (electric or an internal combustion engine) 38 and a chain drivetrain system 100. The chain drivetrain consists of three chains: C1, C2 and C3. Chain one C1 is the first chain that goes between the engine and down to a first end of a jackshaft J1. The jackshaft can be slid forwards and backwards along arrow T2 to adjust chain tension between chains C1 and C2. Then, chain two C2 is also attached to the jackshaft J1 at a second end of the jackshaft and extends back to a double sprocket J2 that is centered about the swingarm pivot. Double sprocket J2 cannot be slid forwards or backwards. Double sprocket J2 is also a jackshaft in that it transfers power from one chain to a second chain, albeit in a very small space. As can be seen, there is a vehicle frame 12 and a swingarm 102 that pivots at the swingarm pivot 104. Chain three C3 starts from the double sprocket J2 at the swingarm pivot 104 and goes back to a chain drive sprocket 130 that then rotates the rear tire for propulsion. Chain three C3 can be tensioned by movement along arrows T3. This is a very simple explanation, but those skilled in the art can appreciate how the three chain drivetrain system operates based on this teaching and that found in the '110 and '465 patents.

There are two main problems with the design shown in FIG. 1. First, because there are three chains, the overall drivetrain system is hard to properly tension, as moving one chain usually interferes with another chain. Chain three C3 can be easily tensioned at T3 by moving the entire rear tire backwards as the double sprocket about the swingarm pivot is fixed in place. The jackshaft J1 connecting chains one and two can move forwards and backwards to create the tension movement T2. Finally, the entire engine 16 can either be moved or pivoted to create the tension movement T1. As can be appreciated upon further inspection, the movement T1 and T2 are in conflict, as movement of one affects the other. Therefore, proper tensioning over time can be very difficult and hard to properly achieve when the chains start to have increased play resulting in unwanted noise and driving displeasure. Furthermore, chain one C1 ends up being very short and displays a higher than wanted temperature which can lead to premature chain failure. The higher temperature is due to the chain one C1 not having enough time to cool down in the cool air such as would a longer chain.

The second problem with this drivetrain design is achieving a proper contact patch with the rear tire 14. As can be seen, the rear swingarm 102 pivots about the swingarm pivot 104 and uses a shock/spring combination 106 to absorb driving shocks and bumps. Using a swingarm for motorcycles is extremely common as every motorcycle that has a rear suspension uses such a swingarm design in some form. Therefore, when reverse trikes are being made, all known reverse trikes utilize swingarms as well.

For example, the Polaris Slingshot® is currently manufactured and uses a swingarm design. The CanAm Spyder® is currently manufactured and uses a swingarm design. The Vanderhall® company currently manufactures a variety of reverse trikes where all designs use a swingarm design. The Campagna T-Rex® is currently manufactured and uses a swingarm design. The inventor also used a swingarm design for his reverse trike vehicle. As can be seen, all manufacturers utilize a swingarm design for their rear suspension.

The problem with a rear swingarm is that as the vehicle leans when cornering, the swingarm causes the rear tire to also lean. This lean of the vehicle causes the rear tire to have a reduced traction patch in contact with the road during a corner. Achieving a rear swingarm that can also pivot about the vehicle centerline is very difficult and complicated. One solution to help alleviate this problem is to create an overly stiff front suspension such that the vehicle does not roll as much when cornering. Unfortunately, this solution is not adequate and results in an overly harsh ride that is not ideal.

Figure 2:
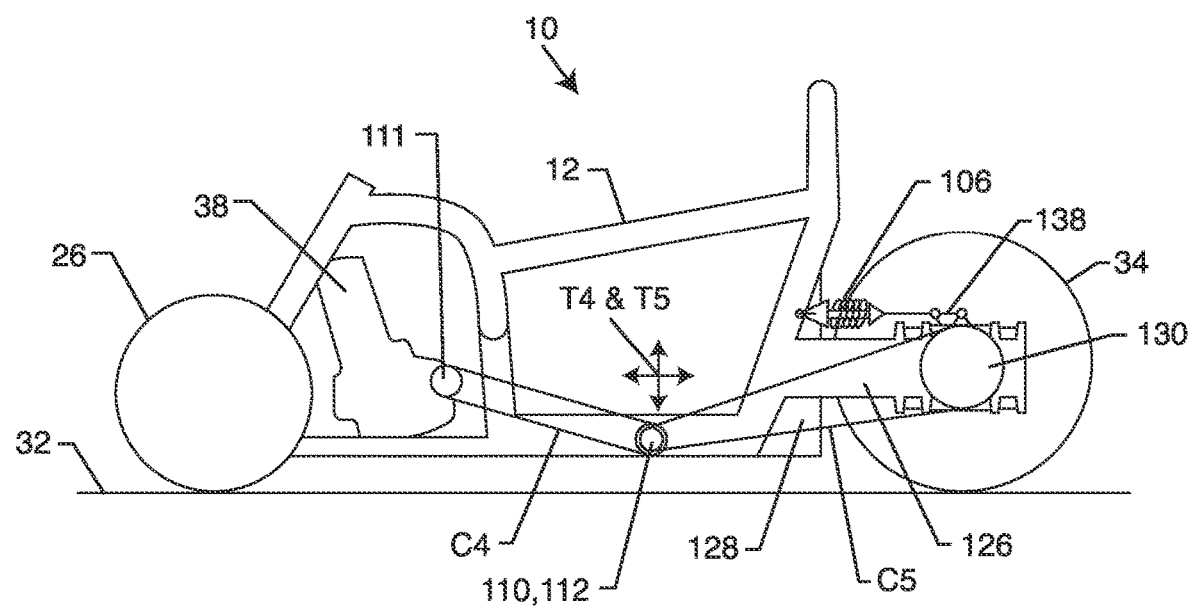
FIG. 2 is a simplified side view of an embodiment of the present invention now showing a novel drivetrain system utilizing just two drive chains connected by a novel jackshaft and a double control arm suspension for the rear tire.

This then brings us to the present invention which is shown in FIG. 2. FIG. 2 is another highly simplified side view of a two chain drivetrain consisting of chains C4 and C5. As can be seen, one of the chains, namely chain three C3 in the prior art, in comparison to FIG. 1 has been eliminated. The motor output sprocket 111 is fixed and also the rear tire no longer moves and is fixed. All of the required tension movements T4 and T5 are accomplished at the new jackshaft design 110 best shown in FIGS. 3 and 4.

Figure 3:
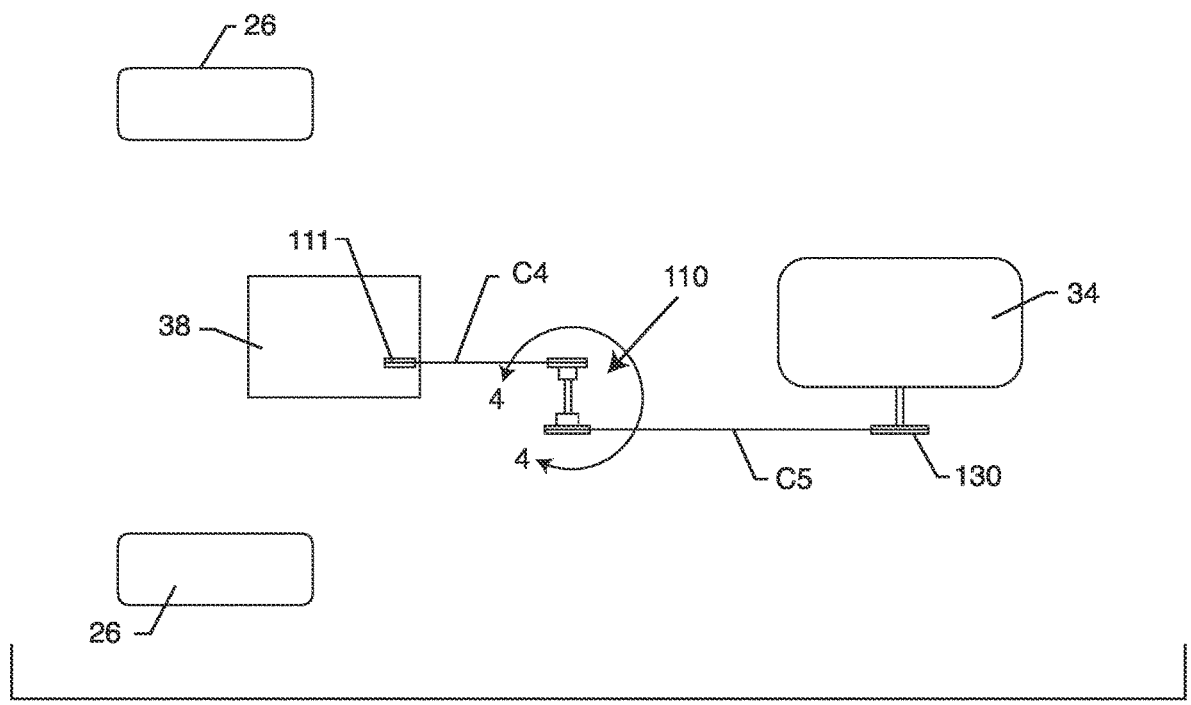
FIG. 3 is a simplified top view of the structure of FIG. 2 with the frame removed.

FIG. 3 is a highly simplified top view of the present invention showing predominantly the drivetrain system. From the engine 38 there is a first chain C4 that extends to a novel jackshaft design 110 (drivetrain system). Then from the jackshaft 112, the second chain C5 extends to the rear tire drive sprocket 130. Through this novel design, all of the chain tensioning adjustments T4 and T5 can be accomplished through the jackshaft design 110,112 as the engine sprocket and rear tire sprocket are now fixed in their location.

It is understood herein that "drivetrain" refers to the system in a motor vehicle which connects the transmission to the drive axle. In many motorcycle engines, the transmission is part of the motor housing, such that a motor output sprocket 111 is presented for attaching to the drivetrain assembly. Furthermore, as used herein, a universal joint is a coupling or joint that can transmit rotary power by a shaft over a range of angles.

Figure 4:
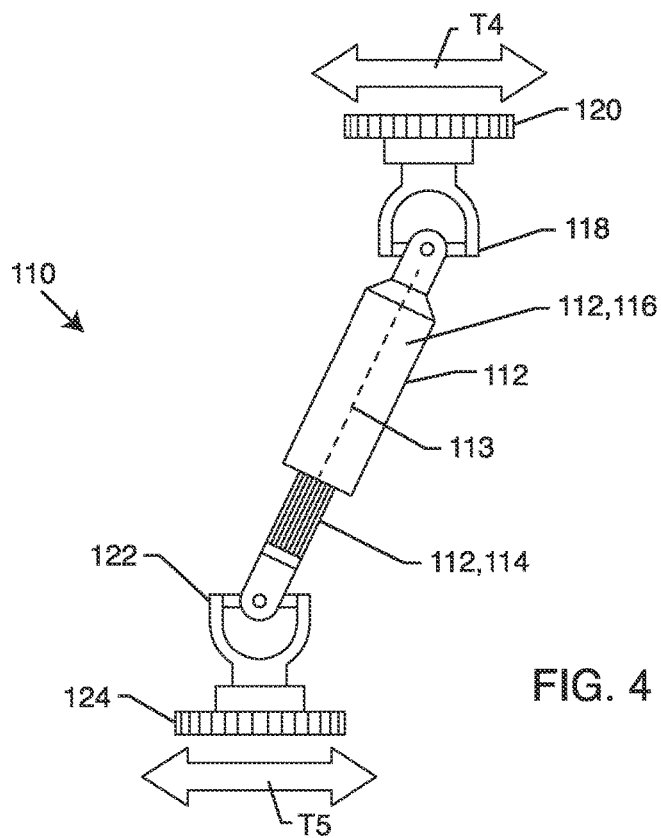
FIG. 4 is an enlarged and simplified top view of a jackshaft assembly used in FIG. 2 taken from section 4-4 from FIG. 3.

FIG. 4 is an enlarged view taken along lines 4-4 from FIG. 3 and shows the novel jackshaft design 110 of the present invention. There is a splined shaft 112 defining a jackshaft axis 113 that comprises a male splined shaft portion 114 and a female splined shaft portion 116. The splined shaft 112 allows for the male and female portions to extend and shorten relative to each other due to movements of the rest of the assembly. It is possible to eliminate the splined shaft in full, or use a different translatable shaft design, however having a splined shaft may be beneficial. At one end of the female splined shaft is a first universal joint 118 which is then attached to a first sprocket 120. The first sprocket is rotatably captured such that it can rotate but also be moved forwards, backwards, and even up and down as needed, which is represented as tensioning movement T4. It is noted that the various bearings and structures to accomplish these movements are not shown but understood by those skilled in the art in light of this teaching. Likewise, at the end of the male splined shaft portion there is a second universal joint 122 which is then attached to a second sprocket 124. The second sprocket 124 can also move forward, backwards, and even up and down as represented by tension movement T5. It is noted that the jackshaft 112 is shown at an exaggerated angle for understanding, but in practice the smaller the angles the better for the universal joints.

For the first chain C4 to be tensioned appropriately, all that is needed is that the first sprocket is moved at T4. For the second chain C5 to be tensioned appropriately, all that is needed is that the second sprocket is moved at T5. This means that each chain can be tensioned without affecting the other chain. Again, the engine driving sprocket 111 and the rear tire drive sprocket 130 no longer need to adjustably move as they can be set once and remain set. As can be appreciated, this novel design dramatically simplifies the drivetrain assembly which was not previously realized nor taught. Another advantage is that less chains are being used such that chain noise has been reduced due to the elimination of one of the chains. Another advantage is that each chain is longer such that it can cool quicker when in use, as in the prior art design shown in FIG. 1 the first chain C1 tends to get very hot during use.

Referring to FIG. 2 again, one will notice that the frame 12 also extends backwards at 126 where the swingarm used to reside. The frame portion 126 is fixedly attached to the rest of the frame and does not pivot or rotate but instead is part of the vehicle frame. It is now noted that a gas tank 128 can now be located behind the driver and in front of the rear tire 14.

Figure 6:
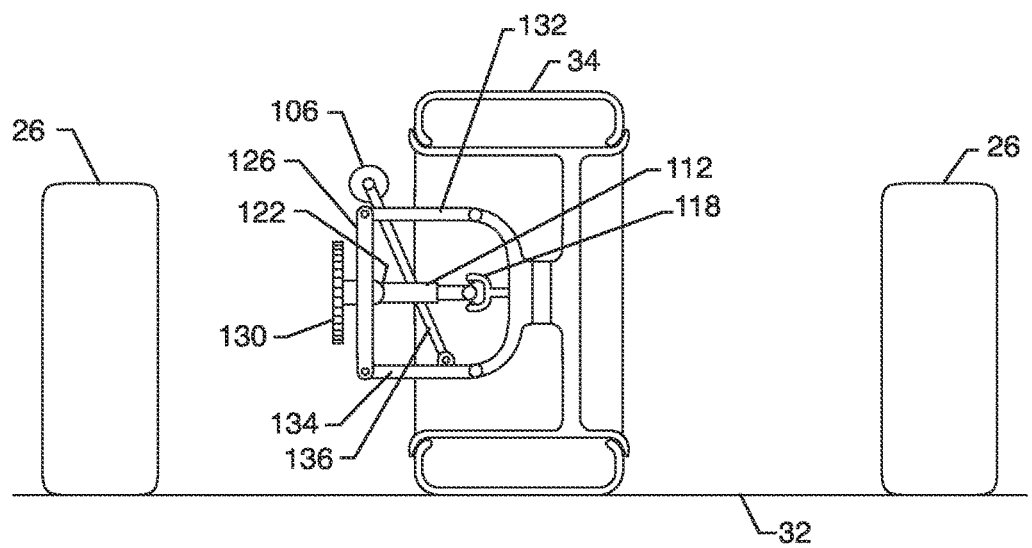
FIG. 6 is a simplified rear view of the rear suspension system utilized in FIG. 2.

Skipping now to FIG. 6, this is a highly simplified rear view of the vehicle shown in FIG. 2. There is a tire drive sprocket 130 that would be connected to the second chain C5 not shown. The tire drive sprocket 130 would then be connected to a similar jackshaft design 112 taught in FIG. 4 that would be used to drive the rear tire 34. In other words, two universal joints (118, 122) and an optional splined shaft assembly (112) is needed to function as an axle that drives the rear tire. Now the rear tire assembly can be attached to the frame portion 126 through the use of an upper control arm 132 and a lower control arm 134. Due to the unequal and/or equal lengths of the upper and lower control arms, the rear tire can now appropriately move up and down and pivot such that as the vehicle hits bumps and leans the tire patch in contact with the ground can be more properly maintained. It is noted that this design is not a single swingarm design, but instead has eliminated the swingarm in full as now the rear tire moves according to the two unequal/equal length control arms 132 and 134.

It is understood that the rear suspension need not be strictly limited to an "A" shape for the A-arm. Rather, any structure such as an H-pattern, U-pattern or the like can be made to allow the rear tire to move up and down utilizing an upper and a lower control arm (support structure). Therefore, the use of the term "A-arm" here and in the claims is meant to cover all of these variations for control arms and not be strictly limited to the exact shape of an A-arm.

A push rod 136 can now be used to drive the rear shock/spring combination 106 via a pivot assembly 138 where the shock/spring combination could be mounted to the frame 12 or frame portion 126. Furthermore, removing the shock/spring combination 106 from the unsprung mass of the rear tire assembly also improves handling.

Another advantage of this novel design is that the rear tire can easily be removed and replaced without having to disassembly any other chains or vehicle components, unlike the design shown in FIG. 1.

Another advantage of this novel design is that the rear brake assembly (not shown) can be relocated either inside or outside of the frame portion 118 such that the rear brake assembly is also not part of the unsprung mass. For example, the brake disk would be mounted to the axle and the caliper would be supported by the frame portion 126. Again, this has a positive effect on handling by reducing the unsprung mass.

Figure 5:
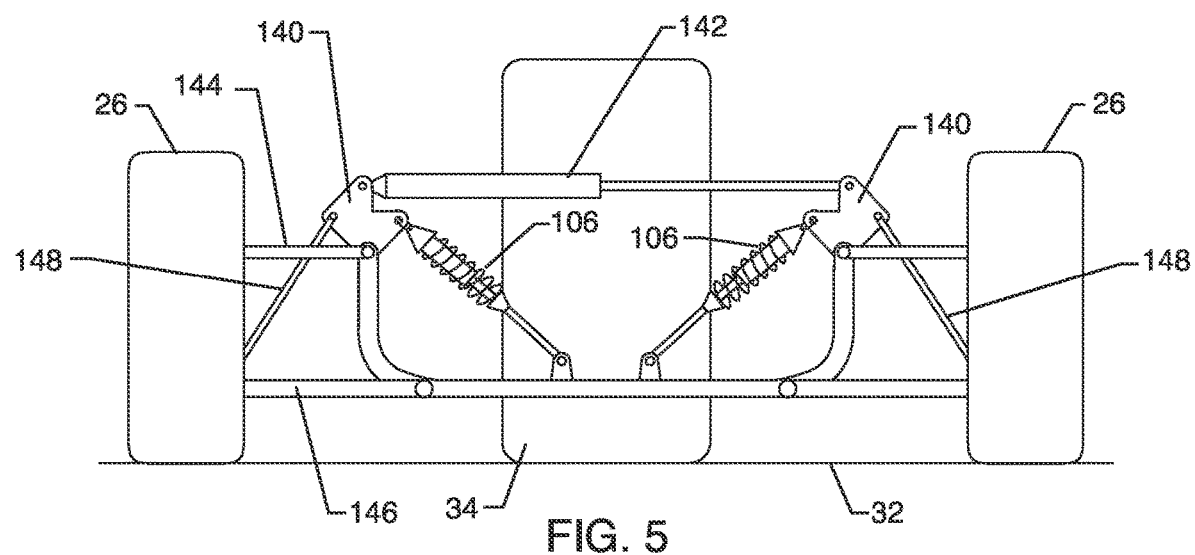
FIG. 5 is a simplified front or rear view of a front suspension system utilized in FIG. 2.

FIG. 5 is a highly simplified front view of the vehicle shown in FIG. 2. Here, the shock/spring combination 106 has been removed from part of the unsprung mass but instead uses pivots 140 to transfer movements between the control arms and the coil-over shocks. Also shown is an additional shock 142 that can be connected between the two pivots 140 to reduce the vehicle's tendency to dive under hard braking. Also shown are upper control arms 144 and lower control arms 146 with pushrods 148. Not shown is the anti-rollbar or steering rack and steering components, but is understood by those skilled in the art that they would be necessary.

Referring back to FIG. 6, it is also understood that the control arm rear suspension system taught herein could be used with a rear mounted engine (internal combustion or electric motor) as well as utilizing a chain drivetrain where only one chain would be required in such an arrangement. This is because the engine would be mounted behind the driver such that a single drive chain would suffice. Therefore, while not shown, this teaching is intended and taught to cover such an embodiment.

In all of the prior art, the suspension movement of the rear tire was in a generally up and down manner. This means that as the vehicle leaned into a corner, the rear tire moved with the frame of the vehicle such that its performance in the corner was less than optimal. This is in contrast to the way front tires are normally configured with unequal A-arms such that the as the vehicle leans the tire angle can move opposite of the vehicle's frame lean to maximize the traction in the corner. As now shown herein, the inventor has devised a way to lean the rear tire as well to optimize traction in a corner.

Figure 7:
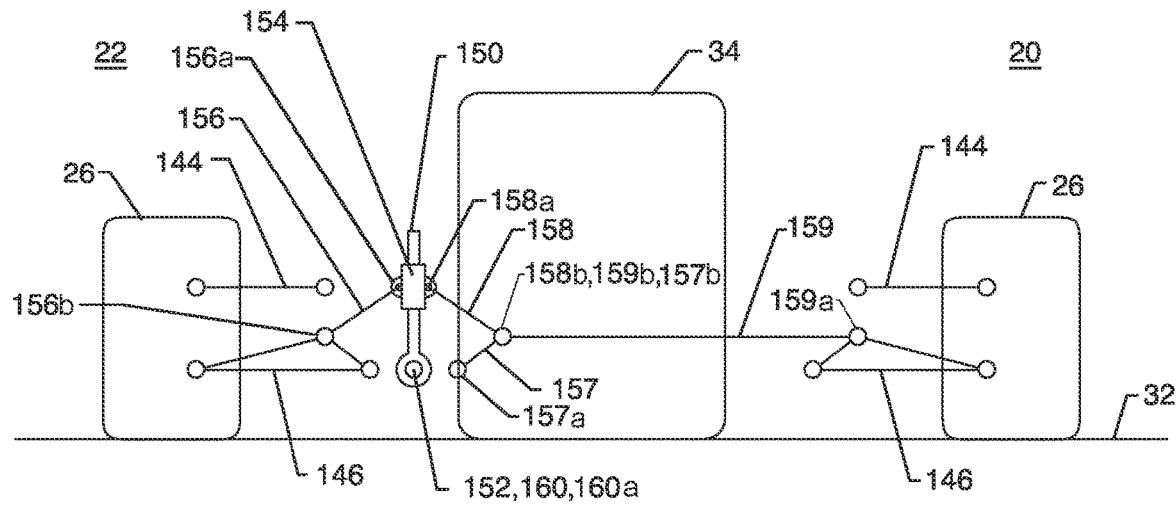
FIG. 7 is a simplified rear view of another embodiment of the front suspension setup that could be added to the embodiment of FIG. 2.
Figure 8:
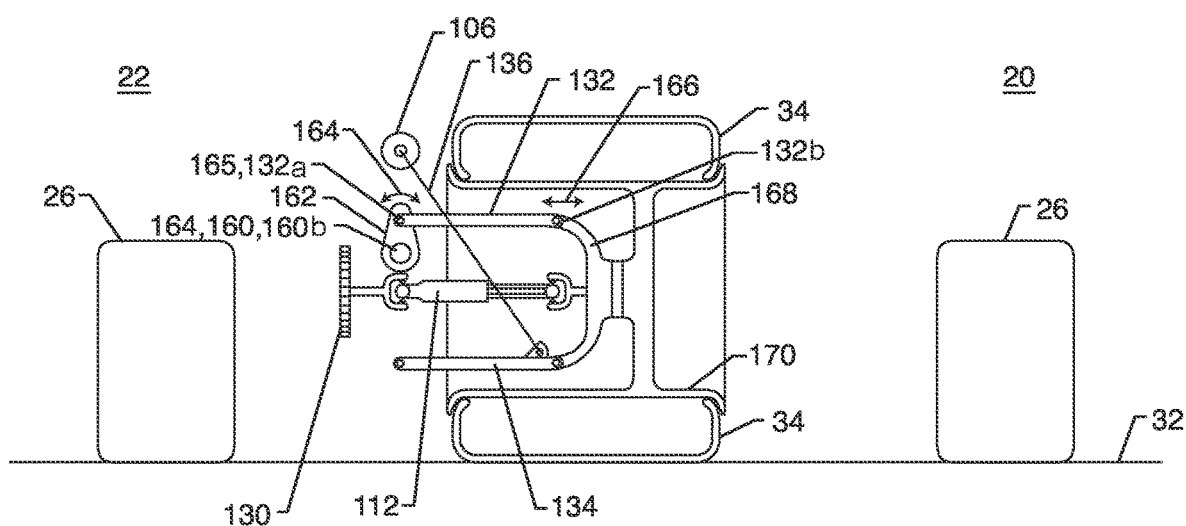
FIG. 8 is a simplified rear view of the rear suspension setup utilized in FIG. 7, now showing how the upper control arm can move dependent upon the front suspension.

FIG. 7 is a simplified rear view of another embodiment of the present invention focusing on the front suspension, as one is seeing through the rear tire. FIG. 8 is the same simplified rear view of the embodiment of FIG. 7 now focusing on the rear suspension. [Para 49] Referring to FIG. 7, the upper A-arms (control arms) 144 and lower A-arms (control arms) 146 are shown. One end of the A-arms are connected to the wheel's spindle (not shown) while the other end is connected to the vehicle's frame 12 (not shown). A lever arm 150 is rotatably (pivotably) coupled to the frame 12 (not shown). The lever arm 150 pivots about axis 152. A slider 154 is attached to the lever arm and can translate up and down the lever arm 150.

A multitude of pushrods are used to connect the slider 154 to the front suspension. Pushrod 156 is pivotably connected to the left lower A-arm 146 and to the slider 154. Similarly, pushrod 158 is pivotably connected to pushrods 159 which in turn is pivotably connected to the right lower A-arm 146. Pushrod 157 is pivotably connected to the frame 12 at one end and to both pushrods 158 and 159 at the other end. All of these pushrods are constrained to transfer their movements into slider 154. As the vehicle makes a turn into a corner, the left and right suspension will move differently such that the lever arm 150 will pivot one way or the other as the slider 154 forces the lever arm to pivot while at the same time moving up and down the lever arm 150. The slider 154 accounts the differential movement of the suspension by being free to slide up and down the pivot arm. If the front suspension hits a bump equally, both lower A-arms would pivot up and equally move the slider 154 up which would result in no tilt of the lever arm 150.

As stated previously, the lever arm pivots about axis 152. A rod (i.e., drive shaft rod or suspension drive shaft rod) 160 is mechanically connected to the lever arm 150 at axis 152 and extends backwards to the rear suspension. This means that the rod 160 can be similar in nature to the various jackshafts previously described with universal joints and splined connections as needed. Rod 160 is quite long, so one must understand that the rotation of rod 160 can be used to couple movements of the front suspension into movement of the rear suspension. To keep the weight of rod 160 to a minimum while still having a high strength, rod 160 would likely be made of a hollow tube of aluminum, composite, carbon fiber or the like.

While keeping the teaching of FIG. 7 in mind, one turns to FIG. 8 of the rear suspension where rod 160 is connected to lever arm 162 along the pivot axis 164. Pivot axis 164 is pivotably connected to the frame 12. This means that as rod 160 rotates, it rotates lever arm 162 so it moves the top of the lever arm 162 either to the left or the right along arrows 164. Upper A-arm 132 is pivotably connected to a distal end 165 of lever arm 162 such that upper A-arm is then shifted to the left or to the right along movement 166. As shown the other end of the upper A-arm is connected to the wheel spindle 168. As previously taught, the rear wheel sprocket 130 is powered by the second chain which in turns drives the rear wheel axle 112 to turn the rear wheel 34 and rim 170.

As can now be appreciated the movement of the front suspension is now coupled to movement of the rear suspension, namely by shifting the rear wheel upper control arm (A-arm) to the left or to the right. (It will be understood that the rear wheel lower control arm could have been shifted to the left or the right as well in a different embodiment not shown) If the vehicle was to make a right hand turn, the vehicle would pitch to the left. This means that the left front wheel would pitch clockwise (camber) in relation to the frame as seen in FIGS. 7 and 8 due to the unequal A-arms to therefore help the left tire to bite into the pavement with the largest tire patch for maximum traction. Likewise, the rod 160 would then cause the lever arm 162 to rotate clockwise and also cause the rear tire to pitch clockwise in relation to the frame to maximize traction of the rear tire. If the vehicle was to make a left hand turn, everything works the same way but in the opposite direction. The rear tire is no longer restricted to a pure up and down movement but can now tilt in camber to maximize traction during cornering. This means that not only do the front tires tilt in camber during a corner, but the rear tire also tilts in camber during a corner.

Figure 9:
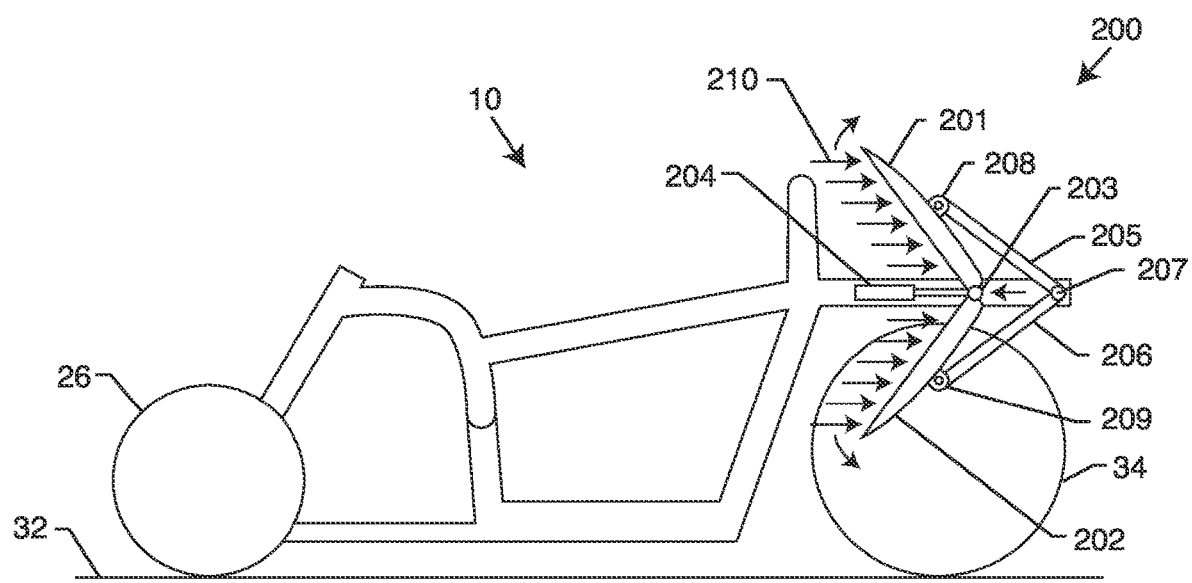
FIG. 9 is a simplified side view showing a novel embodiment of an active aerodynamic air brake system.

FIG. 9 is a very simplified side view of another embodiment of a three-wheeled vehicle 10 previously described now illustrating a novel air brake 200. In the three-wheeled (reverse trike/autocycle) vehicle shown, the driver sits in the centerline of the vehicle. This means that much of the space behind the front tires 26 is unused and available for use. As shown here, a massive air brake 200 has been created to open in an analogous manner to a deployable and retractable parachute to dramatically slow the vehicle during braking. It is intended that there would be a left and a right air brake 200 to take advantage of the open space on each side of the vehicle. As shown here, the frame 12 was extended rearward to support the air brake 200.

There is an upper plate 201 and a lower plate 202. The upper plate 201 opens generally upward while the lower plate 202 opens generally downward. The upper plate and lower plates are pivotably connected together in relation to one another at joint 203. Joint 203 can then be moved forwards and backwards by an actuator 204. There is an upper support rod 205 that is pivotably connected to the upper plate 201 at joint 208 and to the frame 12 at joint 207. Likewise, there is a lower support rod 206 that is pivotably connected to the lower plate 202 at joint 209 and to the frame 12 at joint 207. The reason for this configuration is that it helps alleviate the load off the actuator 204 as the air distribution 210 is better distributed above and below the joints 208/209 such that the air distribution helps to cancel itself and not overpower the actuator 204.

Not shown but described herein, it is understood that the same concept of the air brake system taught herein could be devised where just one air brake is used and rotated 90 degrees as shown herein and disposed directly behind the driver's head but above the rear tire. The air brake would then open to the left and to the right. Likewise, a similar mechanism at taught herein can be used for this embodiment.

Figure 10:
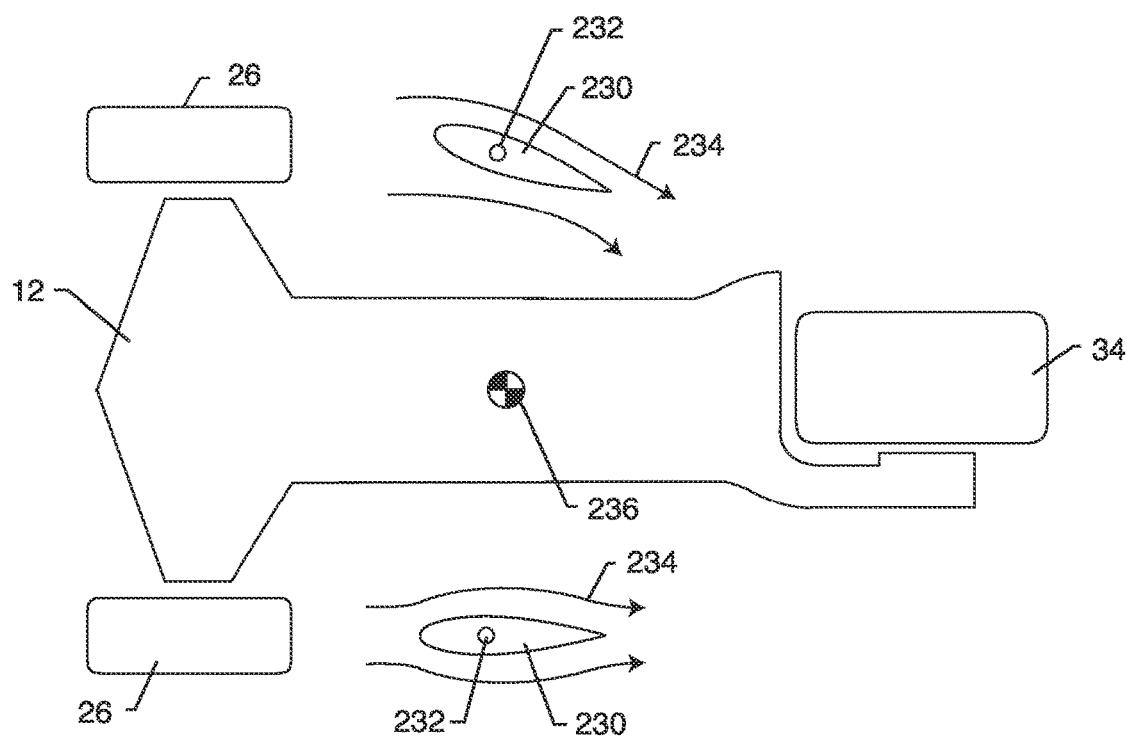
FIG. 10 is a simplified top view showing an embodiment of an active aerodynamic cornering assist system.

FIG. 10 is a very simplified top view of another embodiment of a three-wheeled vehicle 10 previously described now showing a novel vertical fin 230. The frame 12 of the vehicle is simply depicted as an outline for simplicity. As previously described, the area behind the tires 26 are open for use. Now, a left vertical fin and a right vertical fin 230 can be pivotably mounted about axis 232. The fin 230 would use an actuator or similar mechanism to pivot about axis 232 when needed, such as when going around a corner.

As shown herein, the left vertical fin is aligned with the direction of travel such that the air flow 234 simply flows around the fin when going straight. It is understood that both the right and the left vertical fins would be aligned straight when the vehicle was traveling straight. Now, if the vehicle wanted to make a severe right hand turn, one can see that the right vertical fin has been angled to redirect the air flow 234 such that it would help pull the vehicle around the right-hand corner. It is also understood to those skilled in the art that both vertical fins would pivot to help the vehicle make a turn, or each fin could move in a slightly different rotation if needed. One advantage of locating the fins 230 as shown, is that they align generally with the center of gravity 236. This means that the fins 230 would help pull the vehicle around a corner while not affecting the front to rear balance that was inherent in the vehicle's design.

As can be appreciated by those skilled in the art, a normal four seat sports car could integrate such a vertically disposed fin for increased cornering but would be harder to package due to space limitations.

It is also understood by those skilled in the art that a two-seater reverse trike utilizing a side-by-side seating configuration could also take advantage of the embodiments of FIGS. 9 and 10 as these are not limited to a tandem seating arrangement.

The foregoing description of the exemplary embodiments have been presented for the purposes of illustration and description. It is not intended to be exhaustive or to limit the invention to the precise form disclosed. Many modifications and variations are possible in light of the above teaching. It is intended that the scope of the invention not be limited by this detailed description, but rather by the claims appended hereto and all equivalents there.

What is claimed is:

1. A three-wheeled vehicle, comprising:
   a frame configured for supporting a driver and a plurality of mechanical devices, wherein the frame is defined as having a front portion, a rear portion, a vertical cross plane, a right portion, a left portion, and a vertical center plane, wherein the front portion is opposite the rear portion and is generally divided by the vertical cross plane, and wherein the right portion is opposite the left portion and is generally divided by the vertical center plane;

a pair of steerable front wheels rotatably connected to the frame each through a respective front upper control arm and a front lower control arm, where the pair of steerable front wheels are positioned at opposite sides of the front portion generally equally separated by the vertical center plane, and wherein the pair of steerable front wheels rotate in both a pair of rolling axes and a pair of turning axes, wherein the pair of rolling axes allow the pair of steerable front wheels to roll upon a surface wherein the surface is substantially perpendicular to both the vertical center plane and the vertical cross plane, wherein the pair of rolling axes are substantially parallel with the surface, and wherein the pair of turning axes are substantially parallel to both the vertical center plane and the vertical cross plane, wherein the direction of the pair of steerable front wheels can be changed relative to the orientation of the frame about the pair of turning axes through a steering input;

a single rear wheel rotatably affixed to a rear spindle which is pivotably attached to the frame through a rear upper control arm and a rear lower control arm, the rear wheel generally centered along the vertical center plane and positioned about the rear portion behind the vertical cross plane, wherein the rear wheel rotates in a rear rolling axis wherein the rear rolling axis is substantially parallel to the vertical cross plane and substantially perpendicular to the vertical center plane, wherein the rear wheel can roll upon the surface;

a front lever arm pivotably affixed to the frame disposed along the front portion and pivotable about a front lever arm pivot axis, the front lever arm pivot axis being substantially parallel to the vertical center plane and/or surface;

a slider translatably attached to the front lever arm;

a first pushrod pivotably connected at a first end to the slider and pivotably connected at a second end to at least one of the front upper control arm or the front lower control arm of the pair of steerable front wheels;

a rear lever arm pivotably affixed to the frame disposed along the rear portion and pivotable about a rear lever arm pivot axis, the rear lever arm extending to a rear lever arm distal end, wherein the rear lever arm pivot axis is substantially parallel to the vertical center plane and/or surface;

a drive shaft rod connected at a first end to the front lever arm at the front lever arm pivot axis and connected at a second end to the rear lever arm at the rear lever arm pivot axis, wherein the drive shaft rod pivotably connects the front lever arm to the rear lever arm to pivot together;

wherein a first pivotable end of either the rear upper control arm or the rear lower control arm is pivotably connected to the rear lever arm distal end, and a second pivotable end of the respective rear upper control arm or the rear lower control arm is pivotably connected to the rear spindle.

2. The three-wheeled vehicle of claim 1, wherein the rear wheel is connected to a rear wheel drive sprocket; including a motor affixed to the frame generally centered along the vertical center plane, the motor having a motor output sprocket; including a driver seat affixed to the frame disposed after the motor and ahead of the rear wheel; and including a drivetrain system configured to transmit power from the motor to the rear wheel, the drivetrain system comprising:

a first drive chain;

a second drive chain;

a jackshaft having at one end a first universal joint connected to a first jackshaft sprocket and at an opposite end having a second universal joint connected to a second jackshaft sprocket;

wherein the first drive chain is connected between the motor output sprocket and the first jackshaft sprocket;

wherein the second drive chain is connected between the second jackshaft sprocket and the rear wheel drive sprocket;

wherein the first jackshaft sprocket is rotatably attached to the frame and configured to be movable away from and towards the motor output sprocket;

wherein the second jackshaft sprocket is rotatably attached to the frame and configured to be movable away from and towards the rear wheel drive sprocket; and wherein the first drive chain and the second drive chain are the only drive chains in the drivetrain system.

3. The three-wheeled vehicle of claim 2, wherein the jackshaft includes a splined connection having a male spline portion translatable within a female spline portion along a jackshaft axis.

4. The three-wheeled vehicle of claim 3, wherein a rear wheel jackshaft connects the rear wheel to the rear wheel drive sprocket, wherein the rear wheel jackshaft has at one end a rear wheel first universal joint connected to the rear wheel and at an opposite end has a rear wheel second universal joint connected to the rear wheel drive sprocket.

5. The three-wheeled vehicle of claim 4, wherein the rear wheel jackshaft includes a rear wheel splined connection having a rear wheel male spline portion translatable within a rear wheel female spline portion along a rear wheel jackshaft axis.

6. The three-wheeled vehicle of claim 5, wherein a spring and shock are mechanically connected, either directly or indirectly, between one of the lower or upper control arms and the frame.

7. The three-wheeled vehicle of claim 6, including a pushrod mechanically connecting the lower control arm to the spring and shock.

8. The three-wheeled vehicle of claim 1, including a second pushrod pivotably connected at a first end to the slider and pivotably connected, either directly or indirectly, at a second end to at least one of the front upper control arm or the front lower control arm of the pair of steerable front wheels for which the first pushrod is not connected to.

9. The three-wheeled vehicle of claim 1, including a second pushrod, a third pushrod and a fourth pushrod, wherein the second pushrod is pivotably connected at a first end to the slider, wherein the third pushrod at a first end is connected to at least one of the front upper control arm or the front lower control arm of the pair of steerable front wheels for which the first pushrod is not connected to, wherein the fourth pushrod at a first end 157a is pivotably connected to the frame, and wherein a second end of the second, the third and the fourth pushrods are pivotably connected together.

10. A three-wheeled vehicle, comprising:

a frame configured for supporting a driver and a plurality of mechanical devices, wherein the frame is defined as having a front portion, a rear portion, a vertical cross plane, a right portion, a left portion, and a vertical center plane, wherein the front portion is opposite the rear portion and is generally divided by the vertical cross plane, and wherein the right portion is opposite the left portion and is generally divided by the vertical center plane;

a pair of steerable front wheels rotatably connected to the frame each through a respective front upper control arm and a front lower control arm, where the pair of steerable front wheels are positioned at opposite sides of the front portion generally equally separated by the vertical center plane, and wherein the pair of steerable front wheels rotate in both a pair of rolling axes and a pair of turning axes, wherein the pair of rolling axes allow the pair of steerable front wheels to roll upon a surface wherein the surface is substantially perpendicular to both the vertical center plane and the vertical cross plane, wherein the pair of rolling axes are substantially parallel with the surface, and wherein the pair of turning axes are substantially parallel to both the vertical center plane and the vertical cross plane, wherein the direction of the pair of steerable front wheels can be changed relative to the orientation of the frame about the pair of turning axes through a steering input;

a single rear wheel rotatably affixed to a rear spindle which is pivotably attached to the frame through a rear upper control arm and a rear lower control arm, the rear wheel generally centered along the vertical center plane and positioned about the rear portion behind the vertical cross plane, wherein the rear wheel rotates in a rear rolling axis wherein the rear rolling axis is substantially parallel to the vertical cross plane and substantially perpendicular to the vertical center plane, wherein the rear wheel can roll upon the surface;

a front lever arm pivotably affixed to the frame disposed along the front portion and pivotable about a front lever arm pivot axis, the front lever arm pivot axis being substantially parallel to the vertical center plane;

a slider translatably attached to the front lever arm;

a first pushrod pivotably connected at a first end to the slider and pivotably connected at a second end to at least one of the front upper control arm or the front lower control arm of the pair of steerable front wheels;

a rear lever arm pivotably affixed to the frame disposed along the rear portion and pivotable about a rear lever arm pivot axis, the rear lever arm extending to a rear lever arm distal end, wherein the rear lever arm pivot axis is substantially parallel to the vertical center plane;

a drive shaft rod pivotably connecting the front lever arm to the rear lever arm;

wherein a first pivotable end of either the rear upper control arm or the rear lower control arm is pivotably connected to the rear lever arm distal end, and a second pivotable end of the respective rear upper control arm or the rear lower control arm is pivotably connected to the rear spindle.

11. A three-wheeled vehicle, comprising:

a frame configured for supporting a driver and a plurality of mechanical devices, wherein the frame is defined as having a front portion, a rear portion, a vertical cross plane, a right portion, a left portion, and a vertical center plane, wherein the front portion is opposite the rear portion and is generally divided by the vertical cross plane, and wherein the right portion is opposite the left portion and is generally divided by the vertical center plane;

a pair of steerable front wheels rotatably connected to the frame each through a respective front upper control arm and a front lower control arm, where the pair of steerable front wheels are positioned at opposite sides of the front portion generally equally separated by the vertical center plane, and wherein the pair of steerable front wheels rotate in both a pair of rolling axes and a pair of turning axes, wherein the pair of rolling axes allow the pair of steerable front wheels to roll upon a surface wherein the surface is substantially perpendicular to both the vertical center plane and the vertical cross plane, wherein the pair of rolling axes are substantially parallel with the surface, and wherein the pair of turning axes are substantially parallel to both the vertical center plane and the vertical cross plane, wherein the direction of the pair of steerable front wheels can be changed relative to the orientation of the frame about the pair of turning axes through a steering input;

a single rear wheel rotatably affixed to a rear spindle which is pivotably attached to the frame through a rear upper control arm and a rear lower control arm, the rear wheel generally centered along the vertical center plane and positioned about the rear portion behind the vertical cross plane, wherein the rear wheel rotates in a rear rolling axis wherein the rear rolling axis is substantially parallel to the vertical cross plane and substantially perpendicular to the vertical center plane, wherein the rear wheel can roll upon the surface;

a front lever arm pivotably affixed to the frame disposed along the front portion and pivotable about a front lever arm pivot axis, the front lever arm pivot axis being substantially parallel to the vertical center plane;

wherein the front lever arm is mechanically connected to at least one of the front upper or lower control arms;

a rear lever arm pivotably affixed to the frame disposed along the rear portion and pivotable about a rear lever arm pivot axis, the rear lever arm extending to a rear lever arm distal end, wherein the rear lever arm pivot axis is substantially parallel to the vertical center plane;

wherein a first pivotable end of either the rear upper control arm or the rear lower control arm is pivotably connected to the rear lever arm distal end, and a second pivotable end of the respective rear upper control arm or the rear lower control arm is pivotably connected to the rear spindle; and a drive shaft rod pivotably connecting the front lever arm to the rear lever arm.

\* \* \* \* \*